United States Patent [19]
Voss

[11] Patent Number: 5,257,542
[45] Date of Patent: Nov. 2, 1993

[54] SENSOR FOR A CAPACITANCE PRESSURE GAUGE

[75] Inventor: Günter Voss, Much, Fed. Rep. of Germany

[73] Assignee: Leybold Aktiengesellschaft, Fed. Rep. of Germany

[21] Appl. No.: 765,557

[22] Filed: Sep. 25, 1991

[30] Foreign Application Priority Data

Oct. 8, 1990 [DE] Fed. Rep. of Germany ....... 4031791

[51] Int. Cl.$^5$ ............................ G01L 7/08; G01L 9/12
[52] U.S. Cl. ..................................... 73/724; 29/75.41; 73/718; 361/283.4
[58] Field of Search .................. 73/718, 724, 706, 708; 29/25.01, 25.41; 361/283

[56] References Cited

U.S. PATENT DOCUMENTS

| | | | |
|---|---|---|---|
| 4,422,335 | 12/1983 | Ohnesorge et al. | 73/724 |
| 4,711,130 | 12/1987 | Glas et al. | 361/283 |
| 4,864,463 | 9/1989 | Shkedi et al. | 73/718 |
| 5,001,595 | 3/1991 | Dittrich et al. | 361/283 |
| 5,050,034 | 9/1991 | Hegner et al. | 361/283 |

FOREIGN PATENT DOCUMENTS

| | | |
|---|---|---|
| 2436525 | 2/1976 | Fed. Rep. of Germany . |
| 2221062 | 6/1980 | Fed. Rep. of Germany . |
| 2709945 | 7/1986 | Fed. Rep. of Germany . |
| 3841243 | 6/1990 | Fed. Rep. of Germany . |

OTHER PUBLICATIONS

Elektrisch Druckmessung, Schaltungen zur kapazitiven Druckmessun by Otto Muller, date Jan. 1940.

*Primary Examiner*—Donald O. Woodiel
*Attorney, Agent, or Firm*—Wall and Roehrig

[57] ABSTRACT

A sensor for a capacitance pressure gauge having a diaphragm and a base is formed with a series of thin metallic electrode sections formed on the inside of the diaphragm and base. Electrical connection is made to the base electrode sections through the base and one or two pairs of series connected capacitances are formed with the diaphragm electrodes. No direct electrical connection needs to be made to the diaphragm.

6 Claims, 3 Drawing Sheets

005,257,542

SENSOR FOR A CAPACITANCE PRESSURE GAUGE

BACKGROUND OF THE INVENTION

1. Field of the Invention

The present invention relates to a sensor for a capacitance pressure gauge with two discs made of electrically insulating material whereby the rims are joined to each other thus forming a reference chamber, the inside of which is provided with metallic sections, these being the capacitance electrodes, where one is designed as the diaphragm and the other as the base. The reference chamber may be evacuated to provide a vacuum therein.

Capacitance pressure gauges equipped with this type of sensor have an advantage over other types of pressure gauges, in that they are more sensitive and more accurate and that they may be employed in almost all pressure ranges and environments—depending on the stability of the diaphragm and/or the reference pressure within the sensor. However, the manufacturing process for the sensor is rather complex. Especially bonding of the electrodes to the diaphragm is particularly difficult due to mechanical problems, so that the basically excellent measurement properties are impaired.

2. Description of the Related Art

A sensor of this type is disclosed in publication DE-PS-27 09 945. In the case of this known design the leads are lead through to the outside in the plane of the electrodes. This solution requires that the leads penetrate the rim area of the sensor, where the two discs must joined for example by a glass frit seal in a pressure and/or vacuum tight manner. Due to the feed through of the leads, a reliable seal at the rim can not always be guaranteed.

SUMMARY OF THE INVENTION

It is the object of the present invention to develop a sensor of the above-mentioned type, but where the problems related to the bonding process are no longer present.

These and other objects are accomplished according to the present invention by providing at least two separate metallic sections on the inside of the base disc, which form two series-connected capacitances with the electrically connected metallic sections of the diaphragm, the connections of which are located on the base disc.

With an accordingly designed sensor it is thus no longer required to provide any electrical contacts to the diaphragm, so that the previously existing mechanical problems and their effects on the properties of the sensor are no longer present. Surprisingly, it has been found that a sensor of the aforementioned design is also much less sensitive to interfering fields (electric and magnetic) compared to sensors with bonded diaphragm electrodes. Obviously the interfering fields affect all electrodes of the sensor designed according to the invention uniformly, in such a way that the total capacitance remains unchanged.

BRIEF DESCRIPTION OF THE DRAWINGS

Further objects, advantages and details of the present invention will become apparent from the following detailed description and design examples taken in conjunction with the drawings in which.

DESCRIPTION OF THE PREFERRED EMBODIMENTS

Figure 9:
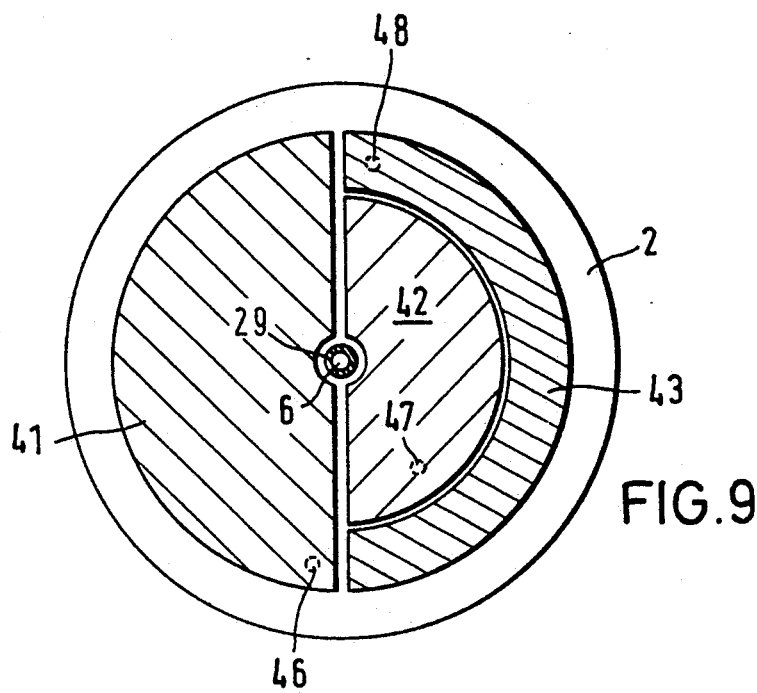
FIGS. 9-11 are views simialr to FIGS. 5-8 respectively of a further embodiment of the invention shown in FIGS. 5-8.
Figure 11:
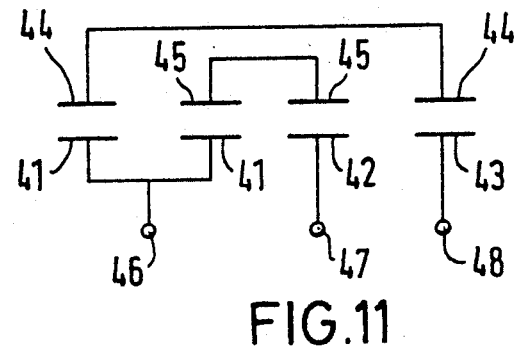
Figure 10:
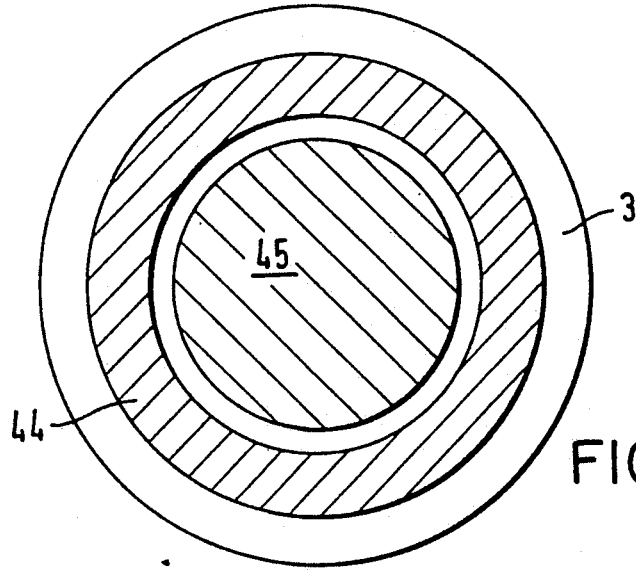

The drawing FIGS. 1 to 4 are schematic representations of a design example for a sensor according to the invention with two electrodes on the base disc, whereas drawing FIGS. 5 to 8 are schematic representations of a design example for a sensor with four electrodes on the base disc, and drawing FIGS. 9 to 11 are schematic representations of electrode designs for a sensor according to drawing FIGS. 5 to 8.

In all figures the sensor according to the invention is marked 1, its base disc is marked 2 and its diaphragm is marked 3. Base disc and diaphram are made of an electrically insulating material for example plastic, glass, ceramic etc. The rim area of base disc 2 and diaphragm 3 are joined, by a glass frit seal 4 or by glue, for example. Bore hole 6 through base disc 2 opens into the thus formed inner chamber 5. The reference pressure in chamber 5 is adjusted with the aid of bore hole 6. After the reference pressure has been adjusted, bore hole 6 is sealed. But it is also possible to provide it with a connection so that a differential pressure sensor is obtained. If the sensor is to be employed in connection with a vacuum gauge, inner chamber 5 is first evacuated via bore hole 6 or a small tube 29 connected to bore hole 6. Getter material is deposited either inside bore hole 6 or within the connected tube 29. After sealing off bore hole 6, for example by fusing the connected small tube 29, the getter material ensures that an extremely low pressure is maintained within chamber 5.

The presented examples are all of a circular or cylindrical structural design. The axis is marked 9.

Shown in drawing FIGS. 2, 3, 6, 7, 9 and 10 are the metallic electrodes on the inside of the diaphragm 3 and base disc 2, which form the desired capacitors. The electrodes are manufactured either by evaporation techniques or by screen printing; they are, for example, 50 μm thick and made of platinum.

Figure 1:
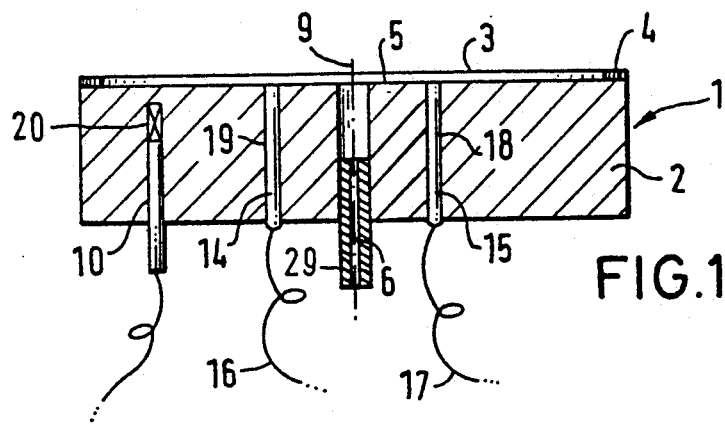
FIG. 1 is a cross sectional view of a capacitive pressure gauge according to the present invention.
Figure 2:
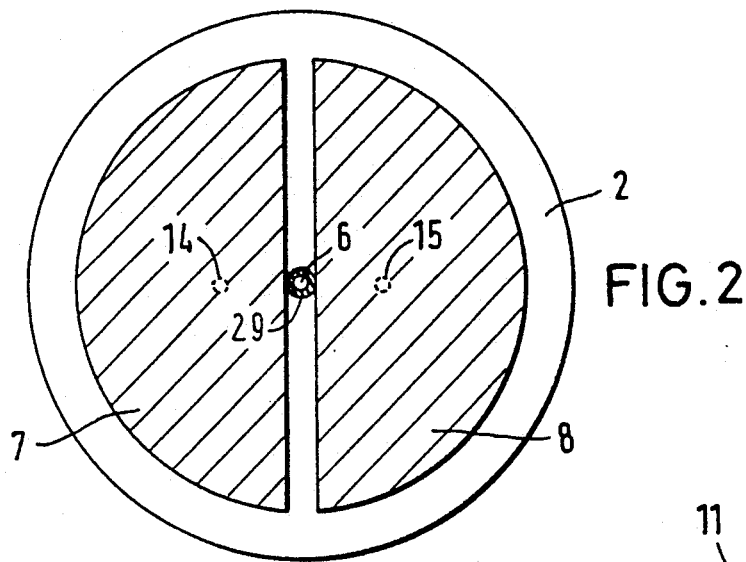
FIG. 2 is a plan view of the top of disc 2 of FIG. 1.

Shown in drawing FIG. 2 are, with reference to the design example of drawing FIGS. 1 to 4, two crescent-shaped electrodes 7 and 8 which are formed on base disc 2. Diaphragm 3 carries the corresponding electrodes 11 and 12, which are electrically connected via link 13. It is also possible to connect the two electrodes 11 and 12 in such a way, that their entire boundaries make contact (shown by the broken line), so that only a circular metallic section is present on diaphragm 3.

Figure 4:
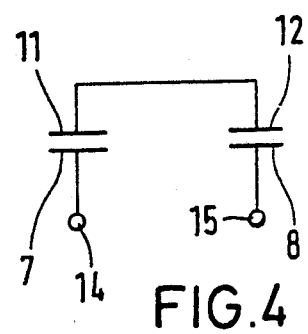
FIG. 4 is a schematic of the capacitors formed by the structure of FIG. 1.
Figure 3:
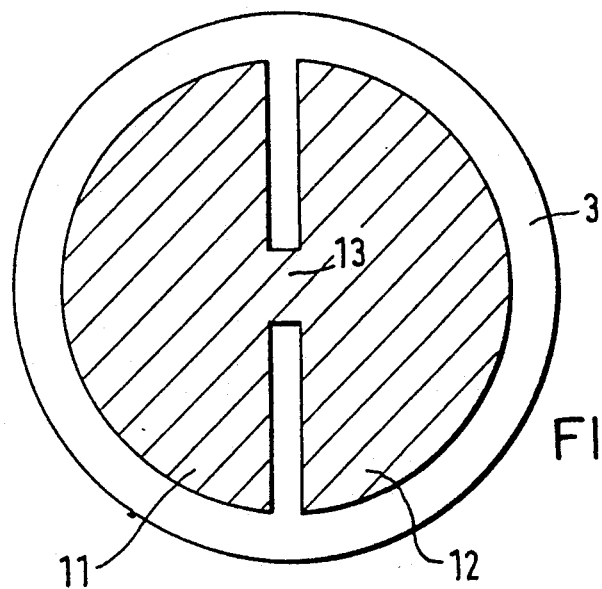
FIG. 3 is a plan view of the bottom of diaphragm 3 of FIG. 1.
Figure 5:
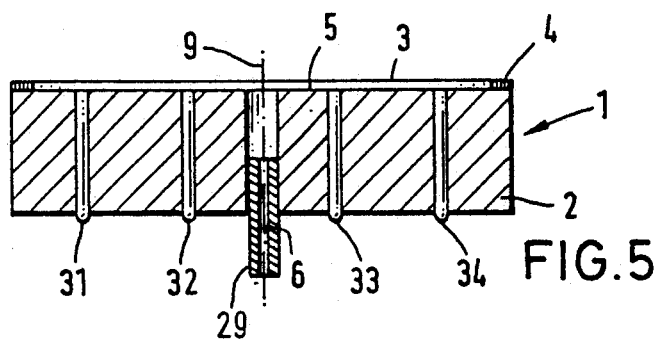
FIGS. 5-8 are views similar to FIG. 1-4 respectively, of another embodiment of the present invention.
Figure 6:
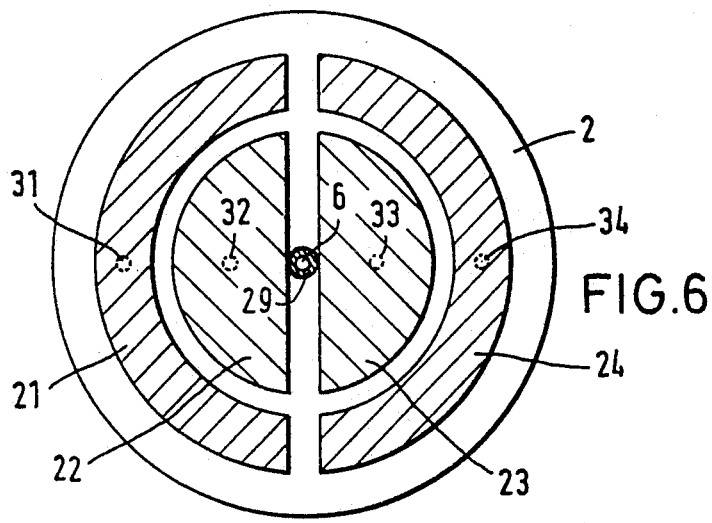
Figure 8:
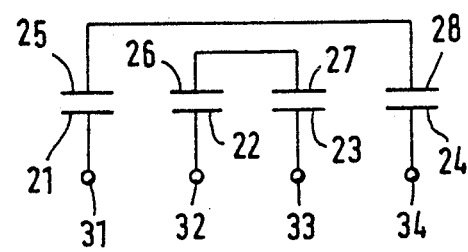
Figure 7:
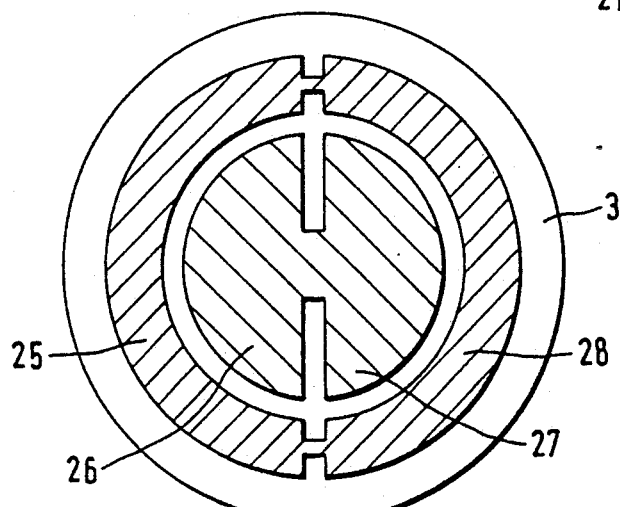

The sections of electrodes 7, 8, and 11, 12 form two series-connected capacitors as shown in drawing FIG. 4. In this design it is no longer required that the diaphragm 3 itself be equipped with leads. Only base electrodes 7 and 8 carry connections 14 and 15 linked to leads 16 and 17, which in turn are connected to a circuit which is not shown. In drawing FIG. 2, connections 14 and 15 are represented by broken lines.

Paraxial bore holes 18 and 19 are intended for forming connections 14 and 15. These are first filled with a solder material. Then the frontal end of disc 2 which is to carry electrodes 7 and 8 is lapped. At the same time of manufacturing of the electrodes, an electrically conducting connection is produced with the solder of connections 14 and 15.

Drawing FIG. 1 also shows that a temperature-dependent resistor 20, for example a PT 100, is present in a further bore hole 10 in base disc 2. The signals from this resistor are supplied to a measurement circuit which is also not shown, so that it is possible to compensate for any temperature instabilities.

In the design example according to FIGS. 5 to 8, base disc 2 carries a total of four 4 electrodes 21 to 24. Together with the pair-wise electrically connected electrodes 25 to 28 on diaphragm 3, electrodes 21 to 24 form two each series-connected capacitors (refer to drawing FIG. 8). Each of the four electrodes 21 to 24 on base disc 2 is equipped with a connection 31 to 34 which is designed according to the design example of drawing FIGS. 1 to 4. This design example too, has the advantage that electrodes 25 to 28 on diaphragm 3 do not have to be provided with connection leads.

The electrodes on base disc 2 and the related electrodes on diaphragm 3 are crescent-shaped (electrodes 22, 23, 26 and 27) or are semi-ringshaped (electrodes 21, 24, 25 and 28). The central electrodes 22, 23, 26 and 27 serve the purpose of measurement signal detection, as the capacitance of the capacitors formed by these electrodes changes significantly during flexing of diaphragm 3. The semi-ringshaped electrodes 21, 24, 25 and 28 are located at the rim of sensor 1. The capacitance of the capacitors formed by these electrodes is hardly influenced by the flexing of the diaphragm. Therefore, these capacitors are employed in a well-known manner for the purpose of temperature compensation.

Shown in drawing FIGS. 9 and 10 are modified sections 41, 42 and 43 on base disc 2 and 44, 45 on diaphragm 3. The semicircular electrode 41 is equivalent to the electrically connected electrodes 21 and 22 of drawing FIG. 6, so that only one connection 46 is required. Electrodes 42 and 43 correspond to the electrodes 23 and 24 of drawing FIG. 6. Electrodes 44 and 45 are practically identical to electrodes 25 to 28 (drawing FIG. 7). These electrodes or sections 41 to 45 respectively also form two pairs of series-connected capacitors (FIG. 11) without the need for contacts on diaphragm 3. Base disc 2 is equipped with the three connections 46, 47 and 48.

What is claimed is:

1. A sensor for use in a capacitance vacuum gauge capable of responding to pressure that includes:
    a base element and a diaphragm element both of which are formed of electrically insulating material, said elements being placed in a face-to-face relationship to form a chamber therebetween;
    at least two thin metallic film sections provided on the chamber side of the two elements, said film sections being arranged to form two capacitors, each capacitor containing an electrode pair with the electrodes being positioned upon opposing sides of said elements;
    first connecting means located inside the chamber for electrically coupling the electrodes on said diaphragm element so that said capacitors are coupled in series;
    second connector means passing through the base element for joining the electrodes on said base element to external leads; and
    sealing means for sufficiently isolating the chamber from the atmosphere whereby a vacuum may be maintained within the chamber.

2. The sensor according to claim 1 wherein four film sections are provided on the vacuum chamber side of the base and diaphragm elements to form two sets of capacitors, and said first connecting means being arranged to electrically connect the capacitors in each set in series.

3. The sensor according to claim 2 wherein two of said film sections on said base element are combined to form a single electrode whereby the base element contains three electrodes, and said metallic film sections on said diaphragm element are combined to form two electrodes which cooperate with the electrodes on the base element to form four series connected capacitors.

4. The sensor according to claim 3 wherein said film sections provided on said diaphragm element form an annular ring-shaped outer electrode positioned about a circular inner electrode, and the film sections provided on said base element include two superimposed crescent-shaped electrodes mounted adjacent to a semicircular shaped electrode.

5. The sensor according to claim 4 further including a temperature dependent resistor positioned within the base element.

6. The sensor according to claim 5 wherein said second connector means includes a plurality of air-tight solder-filled holes that penetrate the base element to couple electrodes on said base element to external leads.

* * * * *